Figure 1:
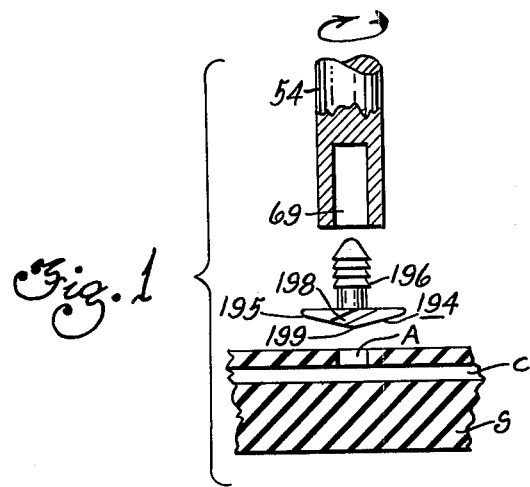

Dec. 28, 1965     E. P. HARRIS ET AL     3,225,641

APPARATUS AND ARTICLE OF MANUFACTURE

Original Filed June 22, 1961

INVENTORS
EDWARD P. HARRIS
CLETUS L. MOORMAN
BY

THEIR ATTORNEY

United States Patent Office 3,225,641
Patented Dec. 28, 1965

3,225,641
APPARATUS AND ARTICLE OF MANUFACTURE
Edward P. Harris, Dayton, and Cletus L. Moorman, Trotwood, Ohio, assignors to General Motors Corporation, Detroit, Mich., a corporation of Delaware
Original application June 22, 1961, Ser. No. 126,419, now Patent No. 3,199,184, dated Aug. 10, 1965. Divided and this application Feb. 12, 1965, Ser. No. 432,322
1 Claim. (Cl. 85—5)

This is a division of co-pending parent application S.N. 126,419—Harris et al. filed June 22, 1961, now Patent 3,199,184—Harris et al. issued August 10, 1965 as well as a related earlier division thereof identified as co-pending application S.N. 324,969—Harris et al. filed November 20, 1963, now Patent 3,199,182—Harris et al. issued August 10, 1965.

This invention relates to assembly of elastomeric sealing strip means and fastening devices to each other.

An object of this invention is to provide a new and improved elastomeric sealing strip and mounting device assembly as a product for facilitating installation thereof subsequently on motor vehicles mass produced where a minimum of production control and inspection are desirable to save time and reduce cost of labor and material.

Another object of this invention is to provide a fastening device having a stem-portion integral centrally with a head portion provided with a semi-arcuate partial spiral cut-out slot to facilitate fitting of the head portion to a cavity of a sealing strip of elastomeric material laterally apertured to a size hole substantially of a diameter equal to that of the stem portion which can be held by a hollow-ended plunger for axially twisting by the plunger while the spiral slot permits threading of the head portion through the hole into the cavity of the sealing strip.

Further objects and advantages of the present invention will be apparent from the following description, reference being had to the accompanying drawings wherein preferred embodiments of the present invention are clearly shown.

Figure 2:
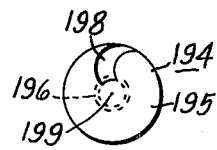

In the drawings:

FIGURES 1 and 2 illustrate side and end views, respectively of a fastening device which can be fitted to an elastomeric sealing strip by plunger twisting for threading of a head portion of the fastening device through a sealing strip hole into a cavity extending longitudinally along one side of the sealing strip.

It is to be understood that the sealing strip of elastomeric material can have a predetermined length corresponding to peripheral distance, for example, around a motor vehicle door where the sealing strip means is to be located as a weather seal. The sealing strip means can be belt-like or longitudinal in configuration depending upon the final use to be made thereof. In any event, the sealing strip means as designated by a reference S includes a longitudinally extending cavity C and apertures or holes A are formed extending laterally therefrom. For further disclosure as to the sealing strip per se reference can be made to an application S.N. 71,463 filed November 25, 1960, now Patent 3,110,938—Beck et al. issued November 19, 1963, and belonging to the assignee of the present invention. The sealing strip can be extruded or molded to have a preformed shape subject to mounting adjacent to a vehicle door, for example, which can have an irregular configuration. In view of such irregular configuration it is necessary to provide fastening means in predetermined locations for holding the sealing strip in engagement with a surface of the door. Sometimes a series of three or four mounting panel apertures are provided closely adjacent to each other such that a relatively sharp bend can be made to fit a sealing strip relative to a door contour and the like. At other times it is necessary to have suitable fastening devices spaced relatively farther apart and a need exists for fitting such fastening devices to sealing strips of this type.

The elastomeric sealing strip can be subjected to feeding through stations in a continuous belt-like fashion or can be fed longitudinally in strips of predetermined length to fit a particular vehicle door. It is possible to program operation of the drilling and inserting mechanisms to correspond with required location of fastening devices for various door structures on differing motor vehicles. Thus basically the same apparatus can be used to effect placement of fastening devices in standardized sealing strips but in differing locations as required for a particular door structure. For example, on some motor vehicles the front door had corners corresponding to contour of a "wrap-around" windshield and in acute angular positions it is necessary to provide fastening devices, such as represented by 194 in FIGURES 1 and 2, in closer relationship to each other so as to avoid buckling and lack of proper sealing relative to such acute angles in certain corners. Also it is to be noted that the sealing strip could be moved at a continuous rate and that the drilling and inserting mechanisms could be movable therewith in predetermined locations for a predetermined length of time during which the drilling as well as the inserting operations occur. A matter of relative movement during the drilling and inserting steps can result in a saving of time so far as the inserting operation is concerned. It is to be understood that a suitable delay means can be used to hold the sealing strip in either of the two predetermined stations for a predetermined length of time during which either the drilling step or the inserting operation can occur.

It would be possible to have the inserting mechanism operable upon a rotatable drum having a plurality of feeder tracks or fixtures located therein such that the drum could be indexed around an arcuate path and the drilling and inserting operations could occur progressively in certain stations while sealing strips of elastomeric material can be manually fitted into the feeding fixtures at other stations. Thus the procedure of drilling and inserting the fastening devices could be speeded considerably where high volume production is required. It is to be noted that the procedure and apparatus in accordance with the present invention requires only a minimum of manual handling of either fastening devices or sealing strips of elastomeric material and the automated operation of the steps of the procedure permit a minimum of production control and inspection which are desirable to save time and reduce cost of labor and material.

After the steps of feeding the elastomeric sealing strip along a predetermined path and aperturing the sealing strip in predetermined locations so as to provide access to a longitudinally extending cavity therein, there is a dilating or expansion of the elastomeric sealing strip in a location where the aperturing occurred at a previous station and a driving means such as 54 can effect operation of components for inserting a plastic nail-like fastening device with a head portion thereof to fit into the cavity of the sealing strip during the dilating or expanding of the elastomeric material of the sealing strip. Holding of a stem portion of the fastening device terminates upon retraction of the driver or plunger thus releasing the plastic fastening device to remain with the head portion thereof in the cavity of the elastomeric sealing strip.

FIGURE 1 illustrates a fastening device indicated generally by numeral 195 and having a head portion 195 integral with a stem portion 196. The stem portion includes ring means and a double tapered pilot end similar to that described in the application S.N. 118,918 Moorman now Patent 3,139,784—Moorman issued July 7, 1964 as belonging to the assignee of the present invention. However, the head portion 195 is modified to have a helical slot 198 cut out as a semi-arcuate partial spiral to facilitate fitting of the head portion to a cavity of the sealing strip such as S of elastomeric material laterally apertured to a size hole substantially of a diameter equal to that of the stem portion. An apex-like end adjacent to the slot 198 and identified by reference numeral 199 in FIGURES 1 and 2 can establish engagement of the head portion relative to elastomeric material surrounding the aperture such as A in a sealing strip S. An arcuate configuration or gradual tapering from the apex 199 results in lateral expanding or dilating of the elastomeric material so as to permit the head portion 195 to be threaded through the aperture A and into the cavity C. The turning or twisting necessary for such threading action can be transmitted from a hollow end 69 of a plunger such as 54 when the plunger is subjected to a rotation or twist about its longitudinal axis once the plunger has been lowered while the hollow end 69 engages the stem portion 196 of the fastening device 194.

Once the fastening devices have been inserted relative to an elastomeric sealing strip it is possible to use a suitable ball bearing roller and the like to cause unloading of the sealing strip with the fastening devices assembled thereto and the following amplified description of added features of the fastening device per se is provided from Patent 3,139,784—Moorman noted earlier. A fastening device has a nail like body of plastic material such as molded polyethylene, Delrin or acetal resin which is a highly crystalline and stable form of polymerized formaldehyde, nylon or long chain synthetic polyamide having recurring amide groups, Teflon or polytetrafluoroethylene as well as relatively stiffer though somewhat resilient phenolic materials and the like. Each shank-like stem portion has a pilot-like free end purposely with a conical and severally tapered first surface which flares laterally outwardly to a diameter that is substantially less than diameter of a mounting-panel aperture and which adjoins a second slightly-tapered annular surface which flares laterally outwardly from a diameter slightly less than diameter of the aperture to a diameter slightly greater than diameter of the aperture having a peripheral surface with rough edges snugly engaged by concentric locking ring means in an intermediate location along the stem portion between the double tapered free end thereof and opposite to the integral head portion. The concentric locking ring means also having a diameter slightly greater than that of the mounting-panel aperture so as to fit snugly therein though avoiding possible damage to the concentric locking ring means by protective guiding and straightening for axial fit to the aperture as the latter is first encountered by the first and second tapered surfaces adjoining each other.

The pilot-like free end of the stem portion purposely has a conical and severly tapered first surface which flares laterally outwardly in a slope approaching substantially 45° to terminate in an annular juncture with an adjoining second and only slightly tapered annular surface. The fastening device 194 is adapted for use in positioning and mounting of an elastomeric sealing strip similar to a type disclosed in U.S. Patent 2,720,685—Harris, belonging to the assignee of the present invention. During mass production of motor vehicles there is need for reliable mounting of elastomeric sealing strips peripherally along junctures between a door or deck lid of an automotive vehicle. Various metal fastenings have been tried and used and difficulty is encountered during positioning of such fastening means to correspond with apertures or rough-edged holes in a sheet metal mounting panel. Such elastomeric sealing strip means can also be provided on domestic appliances such as around a refrigerator door and the like and an inexpensive though accurate and reliable fastening device which can be quickly manipulated and positioned for mounting such a sealing strip is provided in accordance with the present invention.

The fastening device 194 has a nail-like body of plastic material which is moldable, resilient and slightly deformable under ordinary temperature conditions. For example, the plastic material of the fastening device 194 can be polyethylene as well as Delrin or acetal resin which is a highly crystalline and stable form of polymerized formaldehyde commercially available and having metal-like mechanical properties including a high degree of strength and rigidity as well as considerable dimensional stability, tensile and flexural strength. Delrin retains resilience and toughness as well as these other desirable properties even under varying conditions of temperature, humidity, stress and the like. Delrin can be injection molded to close tolerances which contribute to success of the fastening device 194 in accordance with the present invention including structural features pointed out more clearly in the following description. It is to be noted that other suitable plastic materials can be used including Teflon or polytetrafluoroethylene as well as relatively stiffer though somewhat resilient phenolic materials and the like.

Details of the sealing strip S can also be seen in a disclosure of an application S.N. 126,419—Harris et al., filed concurrently herewith now Patent 3,199,184—Harris et al. issued August 10, 1965 and belonging to the assignee of the present invention.

Due to flexibility and resilience of the sealing strip, there is sometimes a misalignment of fastening means relative to apertures in a mounting panel. The multi-tapered end shape of the stem portion effects general centering and guiding into an accurate prepositioning of the fastening device 194. The double tapered surfacing immediately adjacent to the free end of the stem portion can be considered particularly important since these surfaces subsequently serve as a pilot-like structure to assure proper positioning, insertion and locking of the plastic nail-like fastening device 194 relative to an apertured panel. The ring or rib means along the radially outer edges thereof have a diameter substantially equal to the diameter of the secondary tapered surfacing at a location substantially intermediate the stem portion and adjacent to the first or lower one of a series of concentric and axially spaced ring means.

The elastomeric material of the strip is dilated or expanded by forcing apart the elastomeric material around an aperture or hole extending laterally from a cavity in the sealing strip. The aperture or hole has a diameter substantially equal to that of the shank-like stem portions and the outer annular edges of the concentric locking ring means fit snugly into tight engagement with a peripheral surface defining the aperture in a mounting panel.

While the embodiments of the present invention as herein disclosed constitute preferred forms, it is to be understood that other forms might be adopted.

What is claimed is as follows:

On a fastening device of plastic material having a head and an integral stem portion with a multi-tapered end shape, said stem portion including plural abutment means projecting laterally outwardly thereon to engage a mounting panel, and elastomeric weatherstrip means having lateral access openings undercut into cavity locations into which said head portion fits with the stem portion projecting outwardly through a predetermined access opening, the improvement which comprises said head portion being annular and having a flat undersurface, said head having an apex with the uppersurface of said head being downwardly and outwardly inclined from the apex to the periphery of said head, said apex being smaller than said lateral access opening, and a semi-arcuate partial spiral helical slot extending from said upper surface to said undersurface and in one quadrant thereof, said partial spiral helical slot having a location that tapers laterally outwardly from said apex so that said slot and apex together resiliently dilate individual access opening of limited size in the elastomeric weatherstrip means so as to permit said head portion to be threaded through the access opening during a turning and twisting movement transmitted thereto through said stem portion, said stem portion that projects outwardly through the access opening having a diameter substantially equal to the diameter of said lateral access opening and having a longitudinal axis about which said head portion is turned as said apex engages said slot to resiliently dilate said weatherstrip opening.

References Cited by the Examiner

UNITED STATES PATENTS

| | | | |
|---|---|---|---|
| 1,062,635 | 5/1913 | Clements | 85—9 |
| 1,398,083 | 11/1921 | Tibbetts | 85—9 |
| 1,401,584 | 12/1921 | Cizek | 85—9 |
| 2,927,497 | 3/1960 | Rapata | 85—5 |
| 3,110,938 | 11/1963 | Beck et al. | |

EDWARD C. ALLEN, *Primary Examiner.*